Sept. 19, 1933.  L. P. ANDREAS  1,927,695
EDUCATIONAL DEVICE FOR TEACHING ATHLETIC PLAYS
Filed Sept. 14, 1931
Fig. 1.
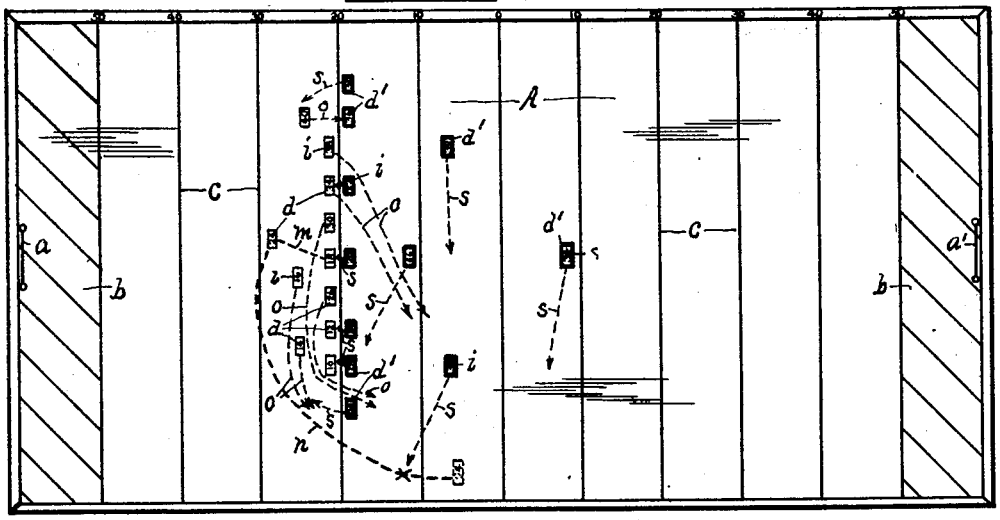
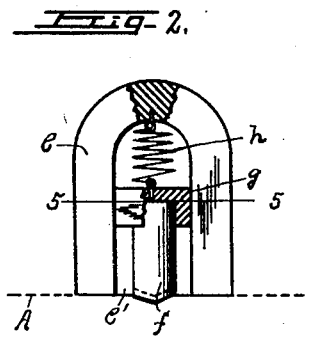
Fig. 2.
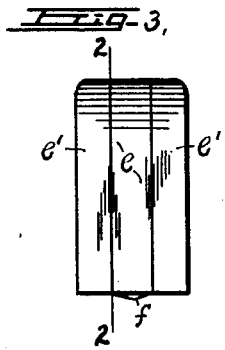
Fig. 3.
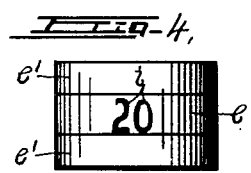
Fig. 4.
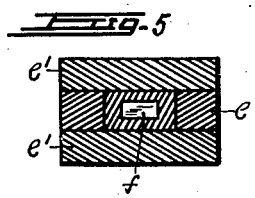
Fig. 5.
INVENTOR
L. P. Andreas
WITNESS
H. L. Meade
By
Denison & Thompson
ATTORNEYS Patented Sept. 19, 1933

1,927,695

UNITED STATES PATENT OFFICE 1,927,695

EDUCATIONAL DEVICE FOR TEACHING ATHLETIC PLAYS

Lewis P. Andreas, Syracuse, N. Y.

Application September 14, 1931
Serial No. 562,763

5 Claims. (Cl. 35—12)

This invention relates to a method of and apparatus for teaching the various plays and counter-plays of football and other athletic games and is adapted to be used more particularly by coaches in training their respective teams in the fundamental plays to be made on the field so that each coach may exercise his own technique or tactics in the training of the individual members of the team for the development of greater efficiency of cooperation of the players whether on the offensive or defensive side of the play.

The main object is to provide simple and efficient means whereby the instructions of the coach to the various members of the team may be carried on indoors or in other relatively small spaces through the medium of separate units representing the various players of opposed teams and adapted to be placed in proper offensive and defensive formation upon a suitable display board or plate and moved by the coach to different positions according to certain possible or probable plays of the members of both teams each endeavoring to defeat the objective of the other in a manner similar to what would be actually practiced upon the field.

This instruction may be accomplished more or less satisfactorily by first marking a representation of the players of both teams in proper formation upon a blackboard or equivalent surface and then drawing the lines or paths of movement which the several players would follow in case of certain plays after the ball has been passed or snapped from the center to the fullback player, but I have found that the instruction may be made far more interesting and efficient by the use of a number of representative player units corresponding to the number of players of both teams adapted to be arranged in proper formation upon a plate or board and capable of being individually moved by the coach in any direction necessary to represent such individual plays as the coach may elect.

One of the specific objects is to construct the several units representing the players in the form of permanent magnets and to arrange these magnetic units in team formation upon an armature plate of iron or equivalent material in such manner that the individual units may be moved by the instructor in any direction across and upon the plate to represent the movement of the player in any particular play without displacing the units from the display plate or armature board.

Another specific object is to provide the magnetic units with chalk, pencils or equivalent markers capable of marking upon the plate the path or movement or movements of any one or more of the units from their initial formation positions so that the members of the class under instruction may easily and quickly visualize the several plays and thereby quickly comprehend the significance of certain cooperative plays.

Other objects and uses relating to specific parts of the apparatus will be brought out in the following description:

In the drawing:—

Figure 1 is a plan of an armature board or plate arranged to represent a football field upon which the magnetic units of opposing teams are shown in more or less regular formation, the dotted lines indicating the paths of movement of the several units across and upon the board to represent certain possible or probable plays of the members of both teams.

Figure 2 is an enlarged face view, partly in section of one of the magnetic player units with the marker therein, the dotted line indicating the surface of the armature plate.

Figure 3 is a side elevation of the magnetic unit shown in Figure 2.

Figure 4 is a top plan of the same unit.

Figure 5 is a transverse sectional view of the magnetic unit taken in the plane of line 5—5, Figure 2.

As illustrated, the armature plate —A— is provided with miniature goals —a— and —a'—, goal zones —b— and —b'— and suitable transverse yardage lines —c— arranged in uniformly spaced relation to and between the goal zones —b—.

Upon the surface of the plate —A— are placed two sets of player units —d— and —d'—, each set comprising a plurality of, in this instance, eleven units representing a corresponding number of players in each team, both sets being shown as arranged in opposed relation in certain prescribed formation representing the actual formation of the players upon the field.

The playing units —d— and —d'— are distinguished from each other by distinctive coloring or other distinctive characteristics so that the units representing the opposed teams and their several plays may be easily and quickly visualized.

As illustrated, the units —d— are represented by relatively light rectangular lines and in this instance are placed in formation to represent the offensive team, while the units —d'— are represented by relatively heavy rectangular lines and are placed in formation to represent the defensive team.

Aside from this distinctive coloring of the units representing the opposed teams, all of the units are of substantially the same construction and each comprises a permanent magnet —e—, preferably of the horseshoe type, and opposed layers —e'— preferably of non-metallic material such as cork or other suitable substance adhesively or otherwise secured to opposite faces of the permanent magnet —e—, the adhesive being preferably rubber cement, shellac, or other waterproof material to assure more permanent connection between the magnet —e— and members —e'—.

These members —e'— are preferably made to conform to the outer contour of the magnet —e— and to extend across the space between the poles of said magnet so that the ends of the members —e'— will lie in substantially the same plane as the end faces of the opposite poles of the magnet, the object of which is to afford a relatively broad bearing for the playing unit upon the surface of the plate —A— to better resist accidental displacement of the units from the armature plate, particularly when the latter is placed in an upright position.

That is, all of the units —d— and —d'— are arranged upon the armature plate —A— with the end faces of their pole pieces in magnetic engagement with the surface of said plate against which they are held by their own magnetic attraction.

Under these conditions, it is evident that the several units may be moved by hand in any direction across and upon the surface of the plate —A— without removal therefrom to represent the actual movement of the players in the field under certain plays made by the players of the offensive team and in order that the paths of movements of the several units may be visualized each unit is provided with a marker —f— of crayon or any equivalent material which is preferably arranged in the opening between the poles of the permanent magnet with its inner end adapted to engage the surface of the plate —A— for marking the path of movement of the corresponding unit —d— or —d'—.

The inner end of this marker —f— is mounted in a socketed supporting member —g— which is slidable between the opposite poles of the magnet —e— and is spring-pressed outwardly by relatively light coil compression spring —h— which is the supporting member —g— and to the intermediate portion of the magnet —e— as shown more clearly in Figure 2, for feeding the marker against the plate as the point of the marker wears away and preventing accidental displacement of the marker from the magnet.

The supporting member —g— and marker —f— carried thereby, together with the spring —h—, are held against undue tilting movement by the members —e'— which together with the poles of the magnet —e— also serve to conceal the major portions of the marker and its supporting and actuating means, it being understood that when the poles of the magnet are placed endwise against the surface of the armature plate —A—, the inner end of the marker —f— will be yieldingly pressed against said surface by the spring —h— and that when the unit is displaced from the plate —A— the marker —f— and its support —g— will be held against accidental displacement by reason of the connection of the spring —h— with the supporting member —g— and intermediate part of the magnet.

If desired, each of the units —d— and —d'— may be provided with different identification characters such as numerals —i—, those representing one team being different from those of the other team to correspond to the identification characters usually worn by the players in the field.

Operation

When the coach is instructing the players as to the various plays to be made under certain plays by the center player through the medium of the apparatus shown, the units —d— and —d'— of the two sets representing opposed teams, will be arranged by the coach in such formation as may be determined upon within the rules of the game by simply placing the units endwise against the surface of the armature plate —A— where they are held by magnetic attraction in the preselected formation.

Now, assuming that the instructor is to demonstrate by means of this apparatus the most strategic positions which the players of either the offensive or defensive teams would take in the field under a certain play such, for example, as an end play by the player receiving the ball, in which case the instructor would first mark upon the surface of the plate —A— a line —m— to indicate the path of movement of the ball from the center unit —d— to a second unit —d— representing the player who receives the ball.

The instructor will then move the second unit from its initial position across and upon the surface of the armature plate in the direction of the assumed play represented in this instance by the line —n— which is preferably made simultaneously with the movement of the second unit by means of the marker —f—.

Immediately following this movement of the second unit —f—, the remaining units of either set or both sets may be moved from their initial positions across and upon the armature plate in such directions as the instructor may elect to represent the most strategic positions of the players of both teams necessary to oppose the objectives of the individual players under the selected initial play.

For example, if the second unit —d— is moved along the line —n— representing that particular end play, the other units —d— may be moved in various directions to different positions upon the plate —A— illustrative of the most advantageous positions the players of that team may assume on the field to support the ball-carrier in his object while the units —d'— representing the players of the defensive team may be moved upon the plate to positions representing the most strategic defensive plays, the paths of movement of the several units of both teams being indicated respectively by lines —o— and —s— which are made upon the plate simultaneously with and by the movements of the individual units.

These lines —m—, —n—, —o—, and —s— are, however, illustratively of only one possible disposition of the units to represent a corresponding field play but obviously the units may be moved to many other positions to represent the most strategic disposition of the players for any predetermined possible plays without displacing the units from the armature plate while the markers of the several units will automatically trace upon the plate the directions and limitations of such movements.

Although I have shown and described the apparatus as used for the instruction of the players in athletic games, it is obvious that it may be used for many other purposes, such for example, as in the representation of proper formation of military and naval units under varying conditions of opposed forces; for the layout of various machines or other units commonly used in large manufacturing establishments; and in fact, for any purpose for which such an apparatus might be useful without departing from the spirit of the invention.

What I claim is:

1. In an educational apparatus for teaching the various plays in athletic games, a horseshoe magnet adapted to be moved across and upon the surface of an armature plate, and a marker supported by and between the poles of said magnet for marking upon said surface the path of movement of the magnet.

2. A player unit comprising a horseshoe magnet adapted to be moved across and upon the surface of an armature plate, and a marker carried by the magnet for marking the path of movement upon said surface.

3. A player unit comprising a horseshoe magnet adapted to be moved across and upon the surface of an armature plate, and a marker carried by the magnet for marking the path of movement upon said surface, and non-metallic members secured to opposite faces of the magnet to extend across the space between the poles.

4. In an apparatus for teaching the various plays in athletic games, the combination with a flat armature plate, of a multiplicity of horseshoe magnets having the end faces of their opposite poles disposed in planes at right angles to their remaining portions and slidably engaged with the flat surface of the plate to magnetically hold the magnets perpendicularly to said surface with their closed ends outermost to serve as handles.

5. In an apparatus for teaching the various plays in athletic games, the combination with a flat armature plate, of a multiplicity of horseshoe magnets having the end faces of their opposite poles disposed in planes at right angles to their remaining portions and slidably engaged with the flat surface of the plate to magnetically hold the magnets perpendicularly to said surface with their closed ends outermost to serve as handles, and layers of non-magnetic material secured to opposite sides of each magnet across the opening between its poles.

LEWIS P. ANDREAS.